United States Patent [19]

Röhm

[11] Patent Number: 4,621,818
[45] Date of Patent: Nov. 11, 1986

[54] HAMMER DRILL SPINDLE AND CHUCK ASSEMBLY

[76] Inventor: Günter H. Röhm, Heinrich-Röhm-Str. 50, D-7927 Sontheim, Fed. Rep. of Germany

[21] Appl. No.: 731,655

[22] Filed: May 7, 1985

[30] Foreign Application Priority Data

May 8, 1984 [DE] Fed. Rep. of Germany ....... 3416966

[51] Int. Cl.[4] .................. B25D 17/08; B23B 31/04
[52] U.S. Cl. ................... 279/1 ME; 279/19; 279/19.5; 279/62; 279/81
[58] Field of Search ... 279/1 K, 1 ME, 19, 19.3–19.5, 279/60–65, 1 R, 1 B, 81, 89, 90, 93, 76, 79, 80; 173/47, 48, 114, 115; 408/241 R; 409/231, 232, 234

[56] References Cited

U.S. PATENT DOCUMENTS

| | | | |
|---|---|---|---|
| 1,888,655 | 11/1932 | Norling | 279/19.4 |
| 2,716,393 | 8/1955 | Fischer | 279/19.3 X |
| 4,131,165 | 12/1978 | Wanner et al. | 279/19.3 X |
| 4,502,824 | 3/1985 | Dohse et al. | 279/1 B X |

FOREIGN PATENT DOCUMENTS

| | | | |
|---|---|---|---|
| 8132988 | 1/1983 | Fed. Rep. of Germany . | |
| 3133085 | 3/1983 | Fed. Rep. of Germany . | |
| 2030485 | 4/1980 | United Kingdom | 279/60 |

*Primary Examiner*—Gil Weidenfeld
*Assistant Examiner*—Steven C. Bishop
*Attorney, Agent, or Firm*—Karl F. Ross; Herbert Dubno

[57] ABSTRACT

The drill chuck comprises a chuck body connected to a drive shaft of a drilling drive device so as to deliver hammer blows to the working tool (e.g. the drill) of a hammer drill and the like, a plurality of clamp jaws which axially guide and hold the drill bit centered on the chuck axis, and a catch device which optionally acts to restrain the drill bit from rotary slipping with respect to the chuck body. The chuck jaws are positioned to axially overlap any axially extending working grooves provided in the drill bit shaft. At least one catch device is provided circumferentially between the clamp jaws, is radially movable in the chuck body and is constructed to engage in grooves running axially in the drill bit shaft or not according to the desire of the operator without loosening during drilling.

8 Claims, 11 Drawing Figures

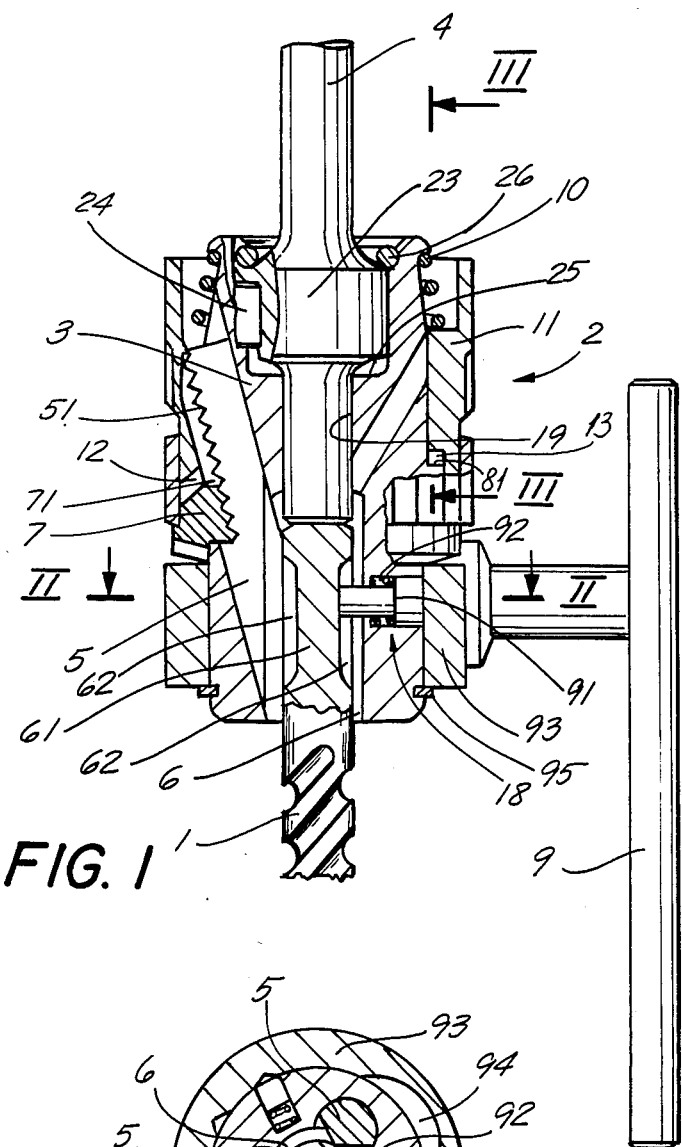
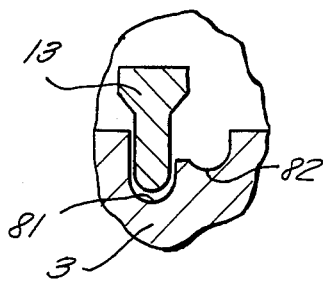
FIG. 3
FIG. 1
FIG. 2

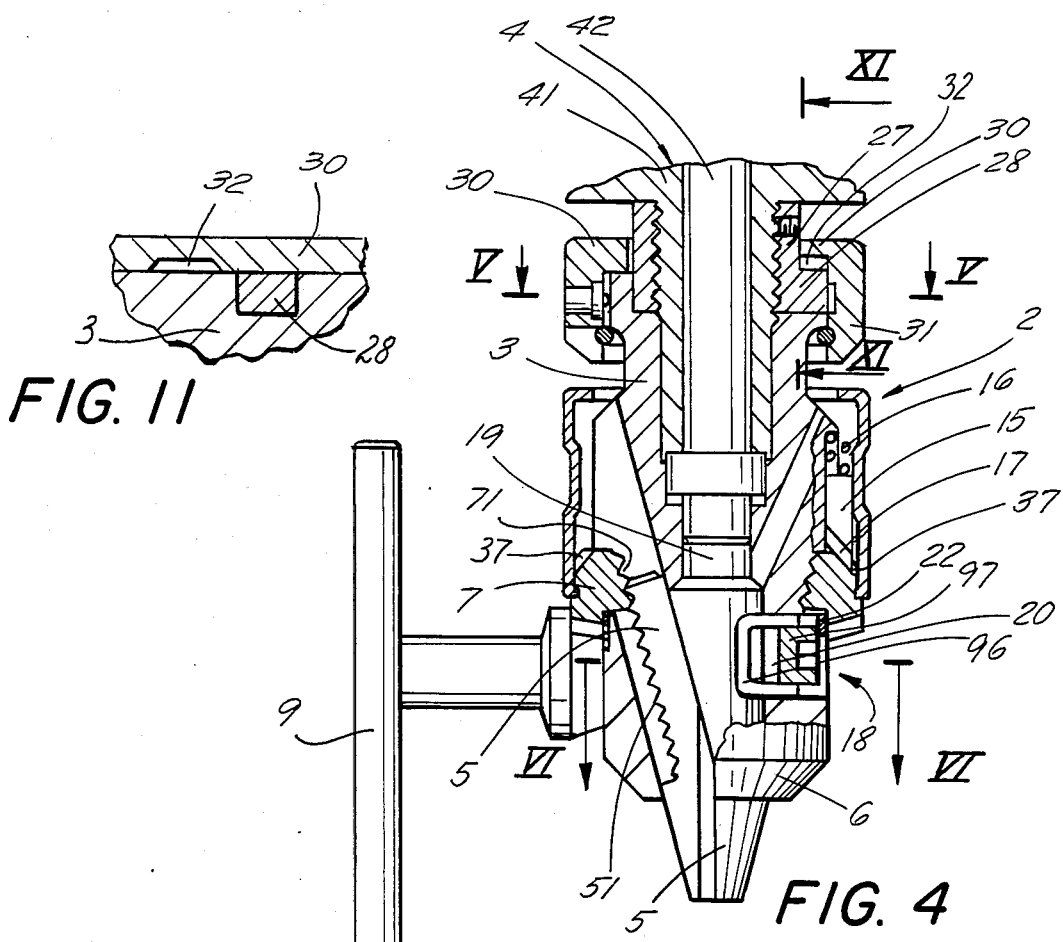
FIG. 11
FIG. 4
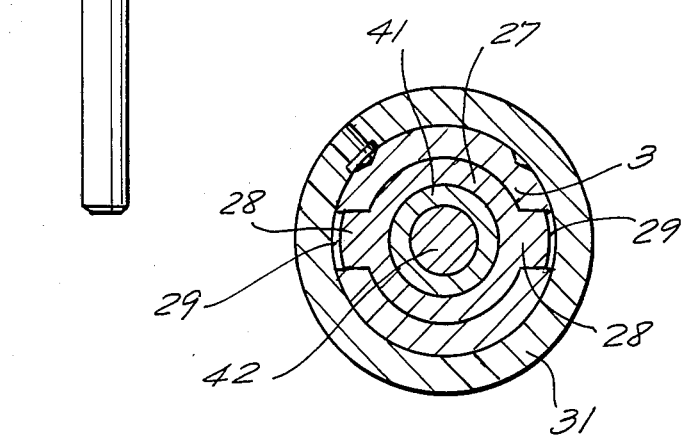
FIG. 5

HAMMER DRILL SPINDLE AND CHUCK ASSEMBLY

CROSS REFERENCE TO RELATED APPLICATIONS

This application is related to the commonly assigned copending applications: Ser. No. 658,133 filed Oct. 5, 1984, Ser. No. 686,243 filed Dec. 26, 1984, Ser. No. 702,049 filed Feb. 15, 1985, Ser. No. 692,902 filed Jan. 18, 1985, Ser. No. 692,907 filed Jan. 18, 1985, Ser. No. 702,053 filed Feb. 15, 1985 and Ser. No. 703,888 of Feb. 21, 1985.

Specifically reference should be had to the concurrently filed copending applications Ser. No. 719,760 and Ser. No. 726,596 corresponding to German applications P 34 16 946.6 and P 34 16 954.4.

FIELD OF THE INVENTION

My present invention relates to a drill chuck for a working tool (bit) for percussion or rotary impact (hammer) drilling having a chuck body connected to a hammer-drill drive shaft or spindle equipped for delivery of hammer blows to the bit.

BACKGROUND OF THE INVENTION

A hammer drill chuck can have a plurality of clamp jaws centered about and axially advanced against the bit, the clamp jaws defining a drill-bit cavity coaxial with the chuck axis for receiving the shank of the bit and are simultaneously moved centrally toward the chuck axis, and further having means for rotational locking of the bit against rotary slipping in the chuck.

A working tool with a smooth cylindrical shaft held slidably axially between clamp jaws in a chuck of the foregoing type is taught in German Patent document DE-OS 31 33 085. The catch device here is an adjustable V-block or dog braceable from the exterior against the shaft of the working tool. The chuck dog secures the bit against relative rotation and is axially slidable at least to the extent of the hammer stroke as well as radially according to the diameter of the working tool shaft.

The braced chuck dog takes part in the hammer motion of the drilling tool and hence its mass may damp the hammer motion or the hammer blows on the working tool. Above all, the bracing of the chuck dog on the cylindrical working shaft, which also serves to restrain the drill bit rotationally, should be sufficient to permit a series of hammer strokes to be applied. The chuck dog more or less digs into the drill bit shaft, but the grip of the chuck dog can be loosened. The chuck dog can then slip axially as well as in the circumferential direction which of course defeats the desired locking of the drill bit.

A percussion drill bit with at least one axially closed axially extending groove on its shank is described in German utility model DE-GM 81 32 988, in which the lengthwise groove is divided by at least one cross-piece in conformity to the contour of the shank into a plurality of sections. This structure of the shank makes possible the use and interchangeability of drill bits both in the common drilling machine and also in the hammer drill. The cross pieces offer the possibility, being positioned laterally across the axially extending groove, for the clamp jaws of the chuck to grasp the drill bit in the case of the hammer drill. On the other hand the groove structure makes possible holding the drill bit in specially constructed percussion drilling device. A number of these grooves exist in the drill bit shaft of this prior art design and they are engaged by locking elements of the drill bit holder so as to be secured rotationally, but with some freedom of limited axial play. However, there is no possibility in this prior art drill chuck, having the locking elements for the grooves of the drill bit, to clamp a drill bit which has a smooth, cylindrical surface without such grooves.

OBJECTS OF THE INVENTION

It is an object of the invention to provide an improved drill chuck for a percussion drill device, hammer drill and the like having an improved efficiency of operation with a high work capacity due to a reliable locking of the drill bit against rotational as well as axial slipping.

A more specific object of my invention is to provide an improved drill chuck of the foregoing kind so that rotational locking of the drill bit in the common percussion drilling device or the hammer drill is provided in an equally good, reliable way while granting an improved working capacity to the drilling machine with a high efficiency, and, of course, so that clamping of the drill bit with its companion moving parts is insured without impairment of the rotational locking of the drill bit in the chuck and without impairment of the axial guiding and coaxial alignment of the drill bit held in the chuck by engagement of locking elements in the lengthwise extending grooves of the drill bit.

It is a further object of this invention to provide an improved drill chuck for a hammer drill and the like which can hold a drill bit with a grooved or without a grooved drill bit shaft so as to provide an improved drill chuck versatility as well as an improved operating efficiency.

SUMMARY OF THE INVENTION

These objects and others which will become apparent hereinafter are attained in accordance with the invention in a drill chuck comprising a chuck body connected to a drilling machine drive shaft or spindle equipped for delivery of hammer blows to a drill bit, a plurality of clamp jaws centered about an axially fed drill bit, the clamp jaws defining a drill bit cavity coaxial to the chuck axis for the drill bit and are adjustable toward the chuck axis, and further at least one catch device for rotational locking of the drill bit against rotational slipping.

According to the invention the clamp jaws axially overlap drill bit grooves provided in the drill bit shaft (i.e. are angularly offset from these grooves), and at least one catch device or element is provided circumferentially between the chuck jaws, wherein the catch element is shiftable radially in the chuck body and is constructed for engagement in the lengthwise running grooves in the drill bit shaft without loosening during drilling so as to restrain the drill bit from rotational slipping.

Consequently a conventional drill bit with a smooth shaft can be grasped and held in the drill chuck in a conventional manner, when the catch device is drawn back from the drill bit cavity in the chuck body and the drill bit cavity is freed to accept the drill bit shaft only.

Alternatively in the drill chuck of the invention a drill bit with radially extending grooves on its drill bit shaft can also be used, wherein the catch device engages in these grooves and rotationally restrains the drill bit securely, without which the clamp jaws alone must clamp against the drill bit shaft radially tightly.

The drill bit is hence held by engagement with the groove axially loosely and is guided and is movable against the fixed clamp jaws axially. Therefore the hammer stroke motion occurs without corresponding axial locking of the drill bit by the chuck jaws and therefore without damping by the mass of those jaws or the chuck.

In this type of operation it is only important that the drill bit shaft in the drill bit cavity be guided above and below the grooves of the drill bit, in order that the engagement of the catch device in one of the grooves can not lead to jamming of the bit shaft. It is enough that the chuck jaws guide the drill bit shaft axially only at the drill bit side offset from the grooves, if precautions for guiding of the shaft ends are properly taken in other ways.

The drill chuck can have an axial opening in the chuck body, through which the blows of the hammer are transmitted directly down by the drive shaft (for example, by means of an axially shiftable ram) against the end of the drill-bit shaft found in the drill-bit cavity. Thus it is a feature of this invention to provide the drill-bit cavity end portion of the chuck with an axial opening acting as an axial guide for the shaft of the drill bit extending into the opening.

The catch device can comprise a catch bolt, which is urged radially outwardly by a spring to contact an outer adjustable ring guided rotatably about the chuck body, whereby the adjustable ring holds the catch bolt so that it protrudes into the drill bit cavity when its inner surface is flush with the chuck body, and has indentations on other portions of its inner surface into which the catch bolt can enter, when the adjustable ring is rotated into a position where the bolts and the indentations coincide. Thus the drill bit will be freed from engagement with the catch bolt. It requires therefore only a rotation of the adjustable ring for the catch bolt, under the force of the spring, to be drawn out of the drill bit thus unlocking it.

Another preferred embodiment of the catch device, which makes possible an especially reliable operation, comprises a headpiece and a rotatable piece adjustable to and fro on the headpiece in the drill-bit cavity, wherein the headpiece is radially shiftable, but unrotatable, about the radially-directed shift axis.

The rotatable piece however is radially unshiftable, but is rotatable about the shift axis in the chuck body, and between the headpiece and the rotatable piece isi a threaded coupling, which converts the rotational motion of the rotatable piece into a radial displacement of the headpiece (to or from the chuck axis).

Advantageously the headpiece is constructed like a U-shaped shackle or stirrup, which is positioned with its shackle back oriented for engagement with the drill bit grooves of the drill bit shaft, and further is guided in an oblong slot of the chuck body, whose longitudinal axis runs in the direction of the chuck axis. The U-shaped headpiece has at the ends of the shackle legs pins directed toward one another which engage in a thread gear or coupling groove in the outer surface of the rotatable piece to form the threaded coupling.

The cylindrical rotatable piece is positioned in the central enlargement of the elongated hole which comprises a blind hole, and the rotatable piece is secured in the blind hole partially covered by an overlapping apron, which makes accessible the key hole provided in the front side of the rotatable piece, which is so arranged for the rotation of the rotatable piece by the key. The apron can be constructed from a circular ring encircling the chuck body.

BRIEF DESCRIPTION OF THE DRAWING

The above and other objects, features and advantages of this invention will become more readily apparent from the following detailed description, reference being made to the accompanying drawing wherein:

FIG. 1 is an axial cross section through a first embodiment of the novel drill chuck according to this invention;

FIG. 2 is a cross section taken along line II—II of FIG. 1;

FIG. 3 is a sectional detail view taken along the line III—III of FIG. 1;

FIG. 4 is an axial cross section of a second embodiment of the drill chuck according to the invention;

FIG. 5 is a cross section through the drill of FIG. 4 taken along the line V—V thereof;

FIG. 11 is a sectional detail view taken along the line XI—XI of FIG. 4.

SPECIFIC DESCRIPTION

Figure 7:
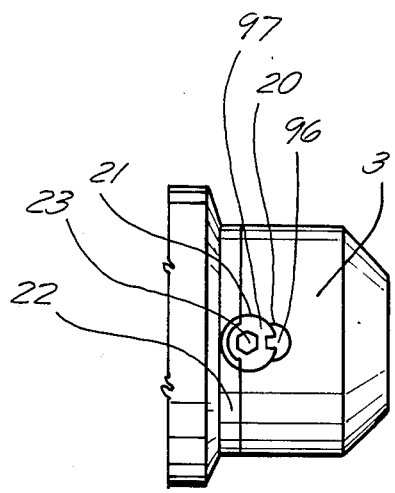
FIG. 7 is a side view taken in the direction of arrow VII of FIG. 6.

The drill chuck 2 serves as a tool holder for the drill bit 1 which is shown in the drill chuck 2 in FIGS. 1 and 2.

The drill chuck 2 has a chuck body 3 which is connected to a drive shaft 4 of an unshown drilling machine equipped to deliver hammer blows onto the drill bit 1, wherein the drive shaft 4 transmits the hammer impact as well as the rotation in the embodiment according to FIG. 1.

In the embodiment according to FIG. 4 the drive shaft 4 is constructed in two parts, namely, a drill spindle 41 which transmits the rotary motion to the drill chuck 2 and a ram 42 fed through the hollow drill spindle 41, which transmits the hammer impact. The drill chuck 2 has the drill bit 1 centered in and axially guided by the chuck jaws 5, which form a drill bit holding cavity 6 for the drill bit shaft 61 coaxial to the chuck axis. The clamp jaws 5 are adjustable centrally toward the chuck axis. Therefore the teeth 51 of the chuck jaws 5 mesh with the inner gearing 71 of a toothed ring 7, which is axially unshiftable but is rotatable and with the assistance of an insertable geared key 9 can be rotated for tightening or loosening of the drill chuck 2.

In order to prevent undesired clamp jaw movements, the position of the toothed ring 7 can be held fixed. Therefore in the embodiment according to FIG. 1, a restraining jacket 11 is axially slidable between two positions rotatably against the pressure of a spring 10. The restraining jacket 11 carries on its forward edge directed toward the toothed ring 7 restraining gear teeth 12, which can mesh in an opposing gear on the ring and restrain thereby the ring, when the restraining jacket 11 occupies its forward position shown in FIG. 1. In the axial position drawn back from the toothed ring 7 the restraining jacket 11 does not prevent free rotation of the toothed ring 7. Both positions of the restraining jacket 11 are flexible in both rotary and axial position by a locking device as seen in FIG. 3. Therefore the restraining jacket 11 is provided with ribs 13, preferably axially oriented, protruding from its inner surface which engage in lock cavities 81 and 82 having different depths in the chuck body 3. The lock cavities 81 are shaped so as to be uniformly closer to toothed ring 7 than lock cavities 82 and preferably the ribs 13 are all the same distance from the front edge of the restraining jacket 11 so that the restraining jcket 11 can either sit with ribs 13 engaging lock cavities 81 as seen in FIG. 3 and thus be in engagement with the toothed ring 7 or it can sit with the ribs 13 in the lock cavities 82 and thereby be held out of engagement with the toothed ring 7.

In the embodiment according to FIG. 4 a lock bolt 15 fed axially on the chuck body 3 serves to restrain the toothed ring 7. Under the force of the spring 16 the lock bolt or pin 15 engages with its forward, drill bit directed, end in a corresponding bolt cavity 37 of the toothed ring 7, wherein the sides of the bolt cavity 37 and the bolt end engaging therein are so inclined that in the engaged position the toothed ring 7 is secured from undesired rotation with respect to the chuck body 3, but nevertheless by rotation of the toothed ring 7 by hand or by means of key 9 the lock bolt 15 is lifted or pressed out of the bolt cavity 37 so that the toothed ring 7 is again freely rotatable.

Alternatively free rotation of the toothed ring 7 can be achieved by prior disengagement of the bolt 15 from the bolt cavity 37.

The chuck body 3 has axial opening 19 through which the downwardly directed hammer blows of the drive shaft 4 or the ram 42 are directly transmitted onto the end of the drill bit shaft 61 seated in the drill bit cavity 6.

In both embodiments, the chuck jaws 5 have are adjacent drill bit groove 62 formed in the drill-bit shaft 61 by which it is gripped. In the circumferential direction between the clamp jaws 5 one finds a catch device 18, which is displaceable radially in the chuck body 3 and is constructed for engagement in the groove 62 running lengthwise on the drill bit shaft 61.

It is sufficient that the clamp jaws 5 should guide drill bit shaft 61 axially only by engaging the surface thereof; if, as in FIG. 4, the possibility exists, that the shaft end of the drill-bit cavity 1 can extend into the drill bit end of the opening 19, then the opening 19 is constructed, and acts as an axial guide for the shaft 61.

In FIGS. 1 and 2, the catch 18 is formed by a catch bolt 91 which is pushed outwardly radially by a spring 92 and against the inner surface of a rotatable adjustable ring 93 affixed on the chuck body 3. The adjustable ring 93 is securable against axial movement by an elastic washer 95. With its inner circumferential surface, the adjustable ring 93 holds the catch bolt 91 in the forward position extending into the drill-bit cavity 6 according to FIGS. 1 and 2. The adjustable ring 93 has on its inner circumferential surface a bolt cavity 94 in which the head of the catch bolt 91 can enter due to the force exerted by spring 92, when a rotation of the adjustable ring 93 positions cavity 94 and adjacent catch bolt 91. When this occurs the drill bit 1 is released, if a drill bit 1 with a grooved shaft 61 is gripped between the clamp jaws 5.

Figure 6:
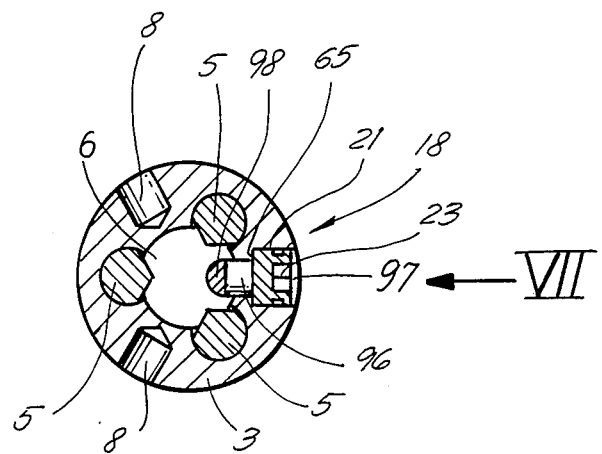
FIG. 6 is a cross section taken along the line VI—VI of FIG. 4.
Figure 10:
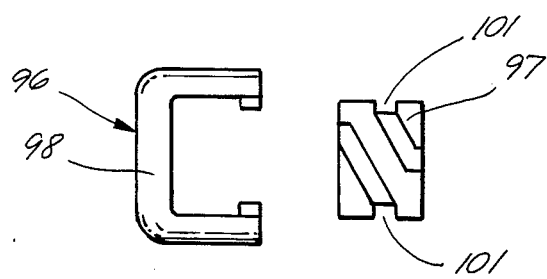
FIG. 10 is an exploded elevational view of the catch of FIGS. 8 and 9 with the individual pieces of this catch separated from each other.
Figure 8:
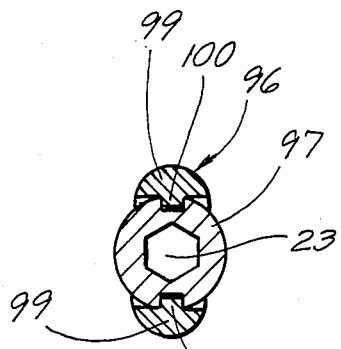
FIG. 8 is a cross section through the catch of the drill chuck of FIGS. 4 to 7.
Figure 9:
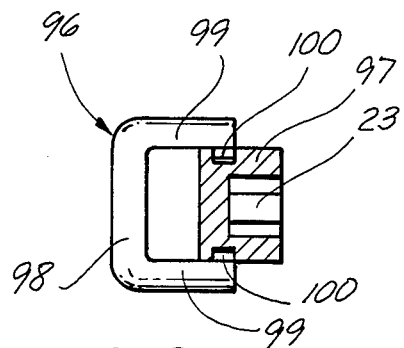
FIG. 9 is a cross sectional view taken along the line IX—IX through the catch of FIG. 8.

In the embodiment according to FIGS. 4 to 10 the catch 18 is formed by a headpiece 96 and a rotatable element 97, which moves the headpiece 96 back and forth in the drill-bit cavity 6. The headpiece 96 is radially shiftable relative to the chuck axis and is unrotatable around the element axis, so that the rotatable element 97 is radially and axially unshiftable and is rotatable about its own axis.

Between the headpiece 96 and the rotatable element 97 a threaded coupling exists, which converts the rotary motion of the rotatable element 97 into a radial shift of the headpiece 96 to or from the chuck axis.

In particular, the headpiece 96 is structured essentially as a U-shaped shackle which is installed in the drill-bit cavity 6 with the shackle back 98 protruding for engagement in the drill bit groove 62, the shackle back 98 being particularly constructed corresponding to the shape of the groove.

The headpiece 96 is guided in an oblong opening 20 in the chuck body 3, whose long axis runs in the direction of the chuck axis. Therefore rotation of the headpiece 96 is impossible. At the ends of the shackle legs 99 pins 100 are directed toward one another. The pins 100 engage in the thread 101 on the outer surface of the rotatable piece 97. The cylindrical rotatable element 97 is positioned in a central cylindrical widening of the oblong hole 20 constructed as a blind bore 21 and is secured to the chuck body against the back 65 of the blind bore 21 and with rotatable element 97 partially covered by an overlapping apron 22, which is constructed as a circular ring surrounding the chuck body 3. The apron 22 allows a key cavity 23 provided in the front of rotatable element 97 to be accessible, in which an unshown key for rotation of the rotatable piece can be inserted and with it the headpiece 96 can be shifted radially.

Moreover, the drill chuck 2 is of course rotatably driven, but axially shiftable with free play on the drive shaft 4 or 41. In the embodiment according to FIG. 1 axial coupling bolts 24 serve to rotatably bind the collar 23 of the drive shaft 4 to the chuck body 3. The coupling bolts 24 are held in cavities extending in both the collar 23 and the chuck body 3 and conformed so that axial relative motion of the chuck body 3 and the drive shaft 4 is allowed. The axial motion play of the shaft 4 is directly limited by a circular shoulder 25 provided in the chuck body 3. The drill chuck 2 is secured on the drill shaft 4 by a spring ring 26, which is overlapped by, and engaged in a circular groove in chuck body 3 and which overlaps the collar 23 lying against the circular shoulder 25.

In the embodiment of FIGS. 4 and 5 a restraining jacket 27 sits fixed on the drill spindle 41, and carries two radial extending pegs 28, which are held in cavities 29 of chuck body 3. The pegs 28 allow a rotational locking of the drill chuck 2 to the drill spindle 41. In order to make possible optionally an axial free play of the drill chuck 2 on the drill spindle 41, the peg cavities 29 which are open axially in the spindle side direction are axially overlapped by an internal collar 30 of a coupling ring 31. This internal collar 30 has axially extending indentations 32 which can be positioned opposite pegs 28 by a corresponding rotation of the coupling ring 31. When coupling ring 31 with the circular surface of its internal collar 30 lies directly on the pegs 28, as shown in FIG. 11, every axial motion of the drill chuck 2 with respect to the drill spindle 41 is restrained thus preventing axial motion free play. However when the coupling ring 31 is rotated so that the indentations 32 are in registration with the pegs 28, the drill chuck 2 is free to slide axially to the extent of the axial height of the indentations 32.

I claim:

1. In a drill chuck of a hammer drill adapted to hold a drill bit wherein said drill chuck comprises a chuck body conformed for connection to a drive shaft transmitting hammer blows to said drill bit, a plurality of clamp jaws which are centered about and movable toward a central axis of said chuck and which define a drill-bit cavity coaxial with said chuck axis, a shaft of said drill bit being guided axially by and centered in said drill-bit cavity in engagement with said clamp jaws, and further a catch device for rotational locking of said drill bit against slipping in said drill chuck, the improvement wherein said clamp jaws are positioned axially along said drill bit shaft, and at least one catch is provided circumferentially between said clamp jaws, said catch being movable radially in said chuck body and securable to said drill bit so as to rotationally restrain said drill bit without loosening during drilling, when said drill bit is provided with at least one groove on said drill bit shaft for engagement with said catch, said catch being retractable whereby said drill chuck is able to hold both selectively smooth and grooved shafts of respective drill bits.

2. The improvement defined in claim 1 wherein said chuck body is provided with an axially directed opening through which the hammer blows of said drive shaft are transmitted directly to an end of said drive shaft found in said drill-bit cavity, the improvement wherein an end portion of said opening at said drill-bit cavity is constructed as an axial guide for said shaft of said drill bit.

3. The improvement defined in claim 1 wherein said catch is a catch bolt pressed radially outward under the force of a bolt spring to contact an adjustable ring guided rotatably outside said chuck body an inner surface of said ring holding said catch bolt to protrude into said drill-bit cavity for engagement in said drill bit, said inner surface of said adjustable ring being provided with at least one bolt indentation therein so that said bolt indentation is positionable by rotation of said adjustable ring into registration with said bolt and said bolt indentation is deep enough to receive said outwardly pressed bolt so as to free said drill bit from engagement with said bolt.

4. The improvement defined in claim 1 wherein said catch comprises a headpiece engageable in said drill bit groove and a rotatable element attached to said headpiece by a threaded coupling radially outside said headpiece so that said rotatable element is radially unshiftable but rotatable so as to cause said unrotatable headpiece to shift radially.

5. The improvement defined in claim 4 wherein said headpiece is constructed substantially as a U-shaped shackle having a protruding shackle back conformed and positioned for engagement in said drill bit groove, said headpiece being positioned in an oblong opening in said chuck body adjacent said drill bit, said oblong opening having a longitudinal axis directed parallel to said chuck axis, said U-shaped headpiece having at each of two ends thereof a pin, said pins protruding toward each other and engaging a thread provided on an exterior surface of said rotatable element so as to form said threaded coupling.

6. The improvement defined in claim 5 wherein said rotatable element is positioned in a blind bore constructed as a central cylindrical widening of said oblong opening and is positioned in said blind bore so that said headpiece is directed through said oblong opening toward said drill bit, and said rotatable element is partially covered at an exterior end thereof by an overlapping apron, which allows access to a key hole provided in said exterior end of said rotatable element for rotation thereof for moving said headpiece radially.

7. The improvement defined in claim 6 wherein said overlapping apron is formed by a circular ring encircling said chuck body.

8. In a drill chuck for a drill bit of a hammer drill, comprising a chuck body, a plurality of clamp jaws in said chuck body centered about and movable toward a chuck axis and defining a drill-bit cavity coaxial with said chuck axis, a shaft of said drill bit being guided axially by, and centered in said drill-bit cavity in engagement with said clamp jaws, and a catch device for rotational locking of said drill bit, the improvement wherein at least one axially extending drill bit groove is provided in said drill bit shaft, said groove axially overlapping said clamp jaws, and said catch device includes at least one catch provided circumferentially between said clamp jaws, said catch being radially movable in said chuck body and constructed for engagement in said axially running groove in said drill bit shaft for locking said drill bit against rotation relative to said chuck body.

* * * * *